(No Model.)

M. S. McCRANEY.
DUMP CART.

No. 468,359. Patented Feb. 9, 1892.

Witnesses
J. Edw. Maybee
W. G. McMillan

Inventor
Moses S. McCraney
by Donald C. Ridout & Co.
attys.

UNITED STATES PATENT OFFICE.

MOSES S. McCRANEY, OF TORONTO, CANADA.

DUMP-CART.

SPECIFICATION forming part of Letters Patent No. 468,359, dated February 9, 1892.

Application filed April 24, 1890. Serial No. 349,340. (No model.)

*To all whom it may concern:*

Be it known that I, MOSES SEYMOUR MC-CRANEY, gentleman, of the city of Toronto, in the county of York, in the Province of Ontario, Canada, have invented a certain new and useful Improvement in Dump-Carts, of which the following is a specification.

The object of the invention is to construct a dump-cart with its body close to the ground, but supported by wheels of large diameter, the shafts of the cart being connected to the body in such a manner that the strength of the horse may be utilized for the purpose of dumping; and it consists in the peculiar construction, arrangement, and combination of parts hereinafter more particularly described and then definitely claimed.

Figure 1:
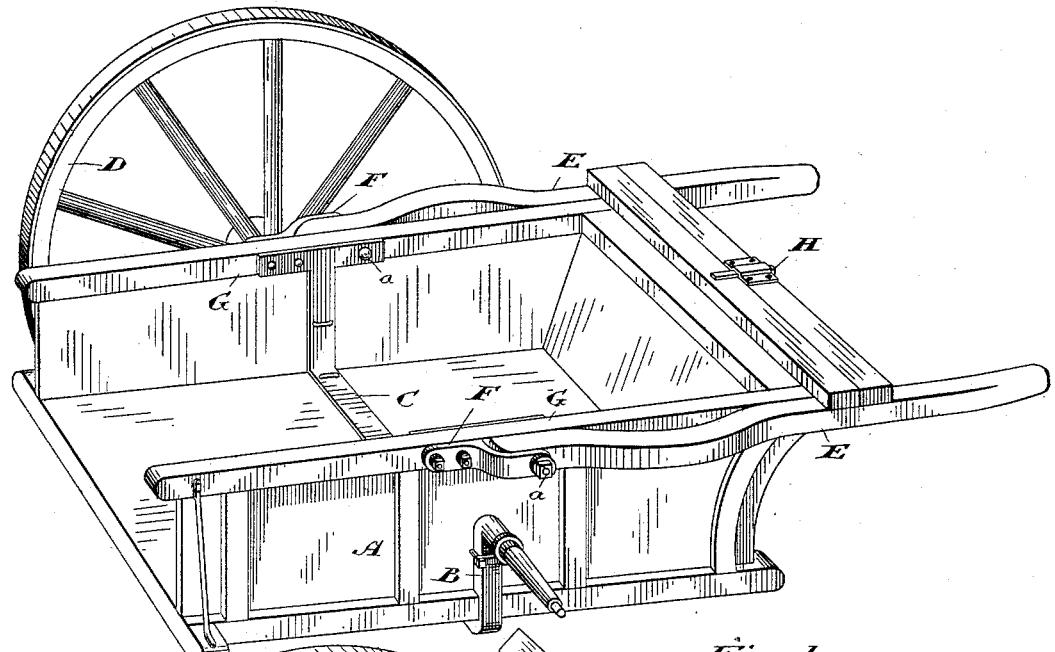
Figure 2:
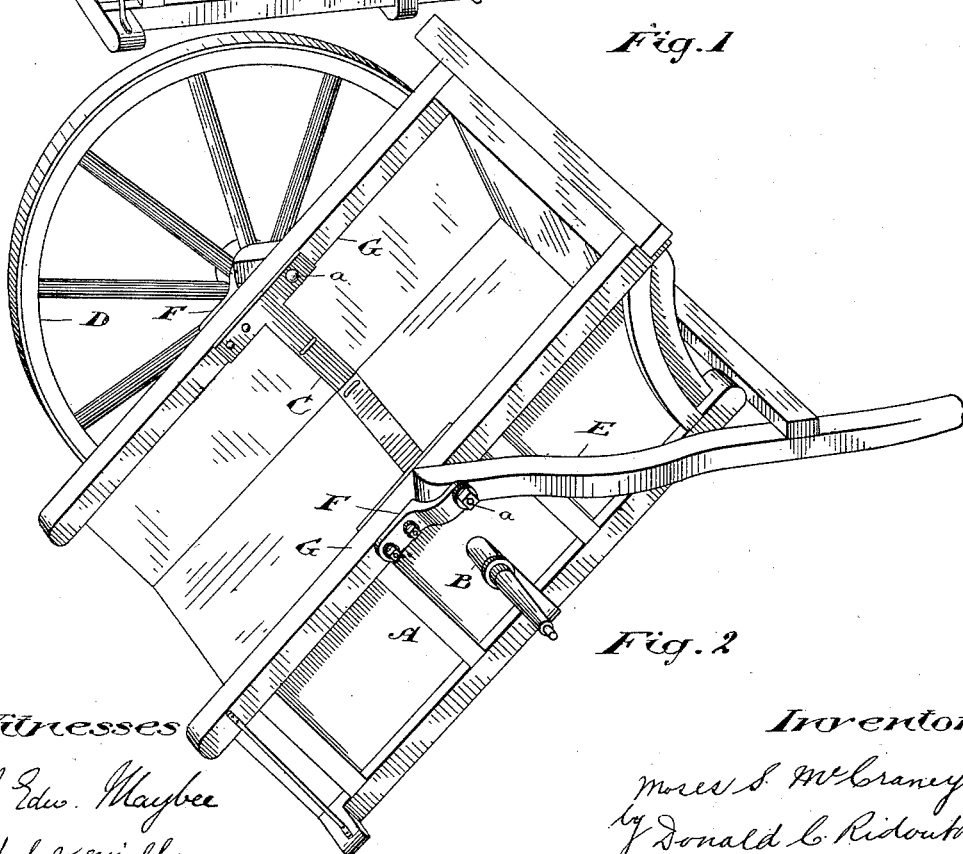

Figure 1 is a perspective view of my improved dump-cart in its normal position with one of the wheels removed. Fig. 2 is a perspective view of my improved dump-cart as it will appear when dumped.

In the drawings, A represents the body of the cart, and B the crank-axle, bent upwardly so as to fit closely to the sides of the body A, to which body the said axle B is rigidly bolted or otherwise fastened.

C is a metal plate placed on the inside of the body A immediately over the axle B.

The ends of the clips which secure the axle B to the body A pass through and secure the plate C in position, the said plate acting as a brace to strengthen the body of the cart, as indicated.

The wheels D are journaled on the axle B, as indicated. Owing to the formation of the crank-axle B, the body A of the cart may be brought as close to the ground as desired, while the wheels, practically speaking, may be made of any size in diameter.

The shafts E are pivoted at $a$ to the body A of the cart. This pivot-point may be made of any form desired. In the form shown it is made by an iron strap or bracket F, rigidly bolted one on each top rail G, the bracket being shaped to fit over the end of the shaft E, through which the pivot-bolt $a$ passes, the metal plate C being shaped, as shown, so as to strengthen the rail G at the point where the pivot is formed and the bracket F is held.

The front end of the body A is locked by a removable bolt H or by any other suitable means.

Owing to the fact that the body A of the cart is rigidly fastened to the crank-axle B and that the said crank-axle B is pivoted on the journals of the wheels D, coupled with the fact that the shafts E are pivotally connected to the cart-body A at a point above the axle-journal, it follows that when the bolt H or other fastening is removed the cart may be dumped by simply backing the horse, and the forward movement of the horse will cause the cart to resume its normal position. As the portion of the crank-axle B to which the cart-body A is secured is below the journals or pivot-pin of the said crank-axle and the pivot-pin of the shafts $e$ is above the said crank-axle journal, the dumping of the cart throws its bottom forward and upwardly, which greatly facilitates the dumping.

What I claim as my invention is—

The combination, in a dumping-cart, of a body A, having top rails G, a bent axle B, embracing the lower part of said body with its ends substantially in the center of the sides of the same, the brackets F, fastened to the top rail G, the shaft E, pivoted between the top rail and the bracket, and the bolt H, arranged to normally hold the shafts in line with the top of the body, substantially as described.

Toronto, April 5, 1890.

MOSES S. McCRANEY.

In presence of—
CHARLES C. BALDWIN,
IRA STANDISH,
   *Of Toronto, Barrister.*